Figure 1:
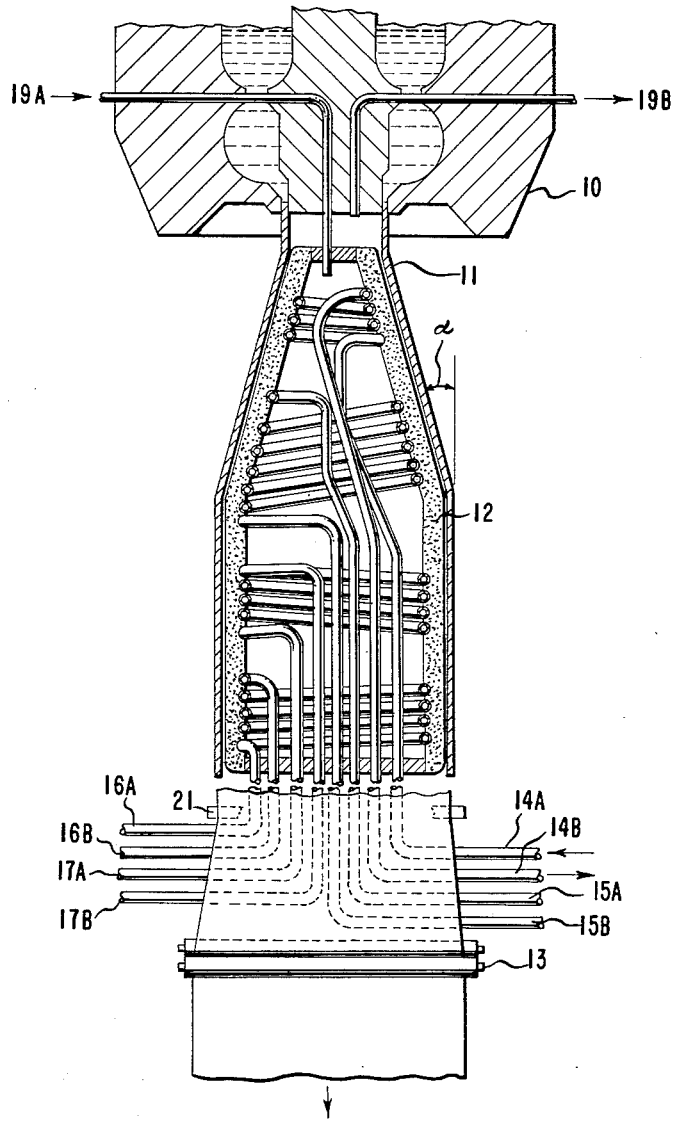

INVENTOR
PHILIP S. BLATZ

BY *Herbert M. Wolfson*
ATTORNEY

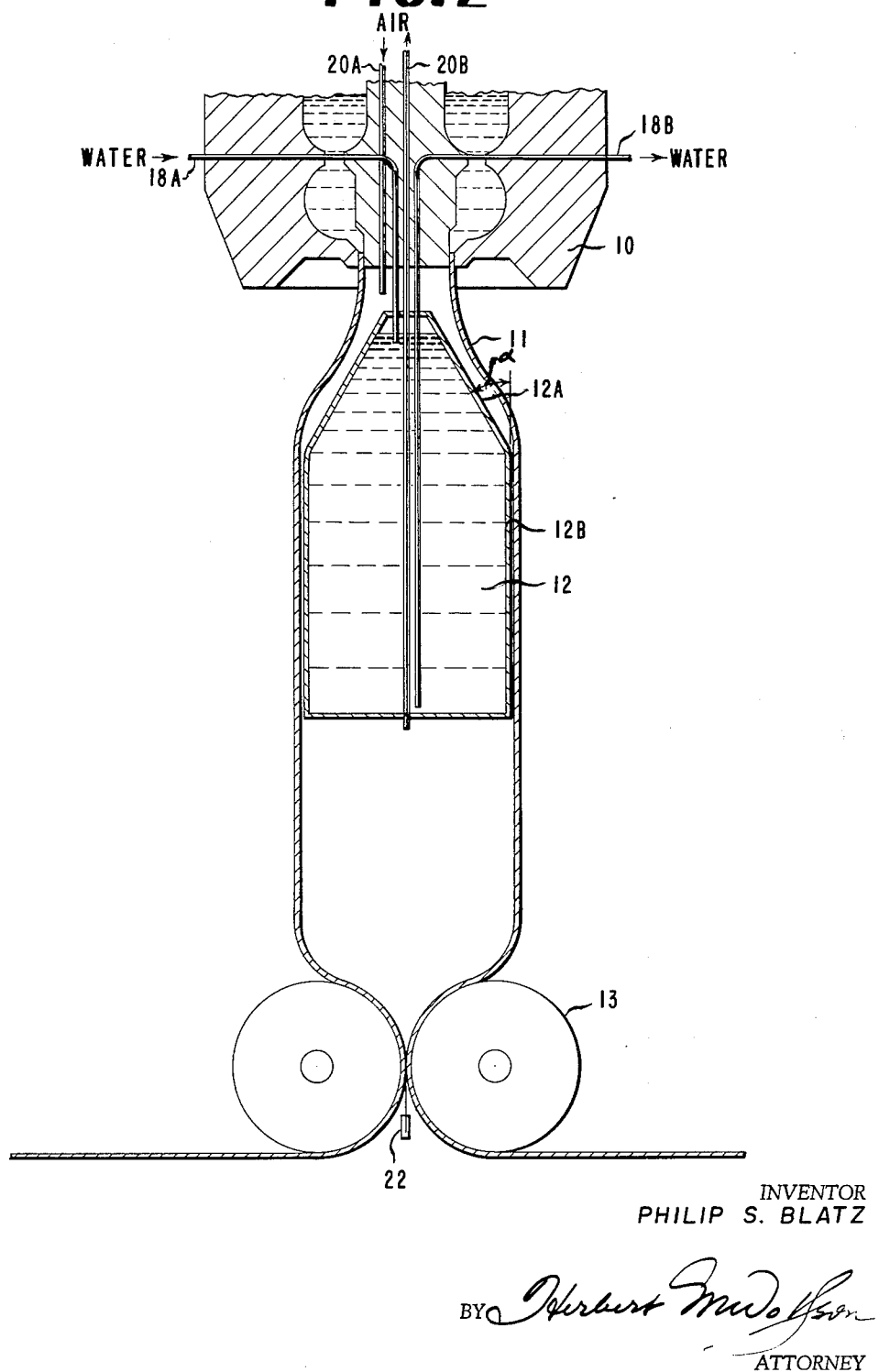

3,246,061
PROCESS FOR PREPARING BIAXIALLY ORIENTED POLYPROPYLENE FILM
Philip S. Blatz, Wilmington, Del., assignor to E. I. du Pont de Nemours and Company, Wilmington, Del., a corporation of Delaware
Filed Aug. 17, 1962, Ser. No. 217,638
3 Claims. (Cl. 264—95)

This invention relates to a novel process for preparing polypropylene film and in particular to a polypropylene film that is durable and is, without a special coating, heat-sealable.

By "heat-sealable" is meant the ability of the film to produce a seal that will withstand a force of at least 1,000 grams for a one-inch sample, the seal having been made by subjecting two overlapping thicknesses of the film to a pressure of 10 p.s.i. with a conventional sealer at a temperature of 200° C. for a dwell time of 1.5 seconds.

By "durable" is meant the ability of the film to withstand at least 90 grams/mil of thickness when subjected to the dart-drop test as described in ASTM–D1709–59T.

By "polypropylene films" are meant films prepared from the polypropylene homopolymer, copolymers wherein propylene is the major comonomer and blends of polypropylene with other polymers, e.g. blends with polyethylene wherein polypropylene or a copolymer thereof is the major constituent. Such films may also contain additives such as plasticizers, dyes, fillers, pigments, slip agents, etc., that do not detract from the basic characteristics of the polypropylene film.

In the development of polypropylene film, it has been found that satisfactory durability may be provided by biaxially orienting the polypropylene film. Biaxial orientation may be accomplished by stretching flat films in two mutually perpendicular directions or by expanding tubular film in combination with stretching the tubular film longitudinally. However, polypropylene films that have been stretched biaxially, while being very tough and durable, become very high melting. Consequently, they must be coated with materials that will melt to provide heat-seals, the heat-seals being absolutely essential in the making of bags. It would be desirable to provide a polypropylene film that is both durable and heat-sealable without a coating. Such a process has now been found.

It has now been found that only by biaxially stretching polypropylene film in a particular manner can one produce the combination of durability and heat-sealability. Specifically, the polypropylene film must be extruded as a molten tubing at a temperature that is usually above 200° C., but not above 275° C., preferably 200–225° C.; advancing it over but out of contact with a cooling surface, the cooling surface consisting of at least two sections: a frusto-conical section, the narrow end of which faces the point of extrusion; and, continuous therewith, a cylindrical section, the frusto-conical section serving to cool the film from the molten state to a temperature within the orientation temperature range, the cylindrical section serving to complete cooling of the film to a temperature of 20–50° C., the annular surface of the frustro-conical section making an angle of 25–35 degrees with the annular surface of the cylindrical section, i.e. the angle of the cone is 25–35 degrees, preferably 30 degrees; expanding the tubing to a diameter of at least 1.5 times, preferably 1.5–3.0 times, its diameter as extruded while advancing it over the cooling surface; and advancing the tubing at a rate of 10–80 times the rate of extrusion.

In the following table, Table I, the orientation temperature range, the density and the crystalline melting point are listed for some representative propylene polymers.

TABLE I

| Polymer | Density at 20° C. (gm./cc.) | Crystalline melting point (° C.) | Orientation temperature range (° C.) |
|---|---|---|---|
| Polypropylene | 0.8825 | 140 | 100–120 |
| | 0.8912 | 150 | 120–140 |
| | 0.9014 | 165 | 125–145 |
| | 0.9092 | 173 | 135–160 |
| | 0.9123 | 179 | 140–160 |

The polypropylene film produced by the process of this invention is heat-sealable and durable. Structurally, it has a crystalline habit as measured by X-ray diffraction that is substantially of the delta form. It has an orientation ratio greater than 2/1 and usually not greater than 15/1 and its orientation angle is between 25 and 125 degrees.

The invention will be more clearly understood by referring to the drawing and examples which follow. In the drawing, FIGURES 1 and 2 are partially schematic views in longitudinal section of apparatus for performing the invention.

Referring to FIGURES 1 and 2, the molten polypropylene is ejected from the die 10 as a tubular film 11. The temperature of the molten resin may be anywhere from 200° C. to 275° C. However, at temperatures above 250° C. it is necessary to use an external air quench at the outlet of the die. This may take the form of a ring surrounding the tubular film, the ring having openings through which cool air may be blown onto the surface of the film.

The tubular film is next advanced over a cooling bell or mandrel 12 by a pull roll set 13. The cooling bell 12 is composed of at least two sections: a frustro-conical section 12A and a cylindrical section 12B. It is preferred to operate with the mandrel 12 disposed as close to the die 10 as possible. The total length of the cooling mandrel will depend upon the final temperature desired for the film, the film speed and the heat transfer efficiency of the particular equipment used. However, the ratio of the frustro-conical section to the cylindrical section should be from 1/2 to 2/1 and the length of the frustro-conical section should be at least half the distance from the die face to the beginning of the cylindrical section, i.e. to the knuckle between the conical and cylindrical sections.

Another critical variable is the surface characteristic of the cooling mandrel, especially at the annular juncture of the frustro-conical section with the cylindrical section. At this point, the surface roughness should be at least 50 microinches based on arithmetic average deviation from the mean height of the surface. At surface roughness values less than this, the extruded film has a tendency to stick to the surface of the cooling mandrel. At higher values, for example, greater than 500 microinches, protrusions from the surface of the mandrel tend to scratch the interior surface of the extruded film. This surprising finding is believed to be due to the propagation of chance contacts. It is theorized that when the surface of the mandrel is too smooth, i.e. less than 50 microinches, occasional contact of gel particles in the film with the mandrel tends to propagate rapidly to cause sticking of a wide area of film. Of course, if the surface of the mandrel is too rough, then the protrusions scratch the film.

Cooling may be accomplished by circulating cooling water through tubes set in the surface of the cooling bell 12. In FIGURE 1, four separate circulatory cooling systems represented by 14A and B, 15A and B, 16A and B and 17A and B for separate control of temperature are shown. In FIGURE 2 a single circulatory system represented by 18A and B is shown. It should be understood that the cooling method is not critical. The important consideration is that the film be cooled to a temperature within the orientation temperature range in the frustro-conical 12A with the final cooling to room temperature taking place in the cylindrical section 12B.

Another important and critical consideration is the angle between the frustro-conical section and the cylindrical section designated in FIGURES 1 and 2 as "$\alpha$". It has been found that this angle must lie between 25 and 35 degrees to obtain the polypropylene film of this invention. If the increase in diameter of the film is more gradual, i.e. the angle is less than 25 degrees, then the final film may be durable but its heat-seal is inadequate. If the angle $\alpha$ is greater than 35 degrees, then, irrespective of the rate of cooling or the increase in diameter of the tubing or the curvature at the knuckle, the film tends to stick to the cooling mandrel. It should also be mentioned that the density of the polypropylene affects angle $\alpha$. The higher densities produce better results at the higher angles.

The tubular film 11 may be expanded by passing a gas transversely through the cooling mandrel in the manner shown in FIGURE 1. In this figure the air is passed in through tube 19A and the amount of air used to expand the film may be controlled by controlling the amount of air out through tube 19B. This particular method of expanding tubular film is described in greater detail in U.S. Patent 2,987,767.

Another method for expanding the tubular film is that shown in FIGURE 2. In this apparatus, air is admitted through tube 20A and forms a bubble of the tubular film between the face of the die and the pull rolls. Excess air to control the size of the bubble and the expansion of the tubular film is bled from the system through tube 20B. This particular method is described in greater detail in U.S. Patent 2,966,700. In either case, it has been found to be critical for the results of this invention to expand the film by gas pressure to the extent of at least 1.5 times the extruded diameter and preferably from 1.5 to 3.0 times the extruded diameter.

The amount of longitudinal stretching is controlled by the speed of the pull roll set 13 relative to the speed of extrusion. For the purpose of the present invention, it is preferred that the speed of the pull rolls be such as to produce film properties in the longitudinal direction that are substantially the same as those produced by the expansion in the transverse direction. In the operation of this process, the total drawdown due to the relative rates of the pull rolls and extrusion is between 12 times and about 15 times. However, much of this drawdown occurs on the molten resin with a minimum effect on orientation.

The tube is then slit, using in FIGURE 1 slitting blade 21 which may serve to produce either two flat sheets or, by limiting the length of the blade, one flat sheet. In FIGURE 2, slitting is accomplished immediately after the film has been pulled through the rolls 13. Here again, two flat film sheets may be produced by using a slitting blade 22 as shown or one flat sheet may be produced.

Example I

The equipment for carrying out this example is shown schematcially in FIGURE 2. Tenite polypropylene resin No. 4240 (obtained from Eastman Chemical Products) was extruded through a 3¼ inch diameter extruder and through a circular die of 8 inches diameter at 215° C. The lip opening of the die was 20 mils. The output of the resin was 40 lbs./hour. The film speed was 40 feet/minute. The diameter of the cooling mandrel was 12 inches. The distance of the die to the knuckle of the cooling mandrel was 12 inches. The angle of the surface of the frustro-conical section with the annular surface of the cylindrical section was 30 degrees. The extruded tube was slit into two flat sheets which were wound on separate rolls.

The physical properties of the film so produced are listed in Table II.

TABLE II

|  | MD |  | TD |
|---|---|---|---|
| Modulus, p.s.i. | 66,000 |  | 76,000 |
| Tear, gram/mil | 52 |  | 67 |
| Heat-seal strength, gram/inch |  | >1,000 |  |
| Dart drop, grams/mil |  | 178 |  |
| Haze, percent |  | 0.8 |  |
| Transparency, percent |  | 85 |  |
| Gloss, 20° |  | 125+ |  |
| Orientation ratio |  | 3.5/1 |  |
| Orientation angle, deg |  | 122 |  |
| Crystalline habit |  | Delta |  |

Description of Tests

The heat-seal test is carried out by sealing two one inch wide strips of film to each other at one end of the strips at a temperature of 200° C., a dwell time of 1.5 seconds and a pressure of the sealing bar of 10 p.s.i. The unsealed ends are placed in a Suter tester and pulled apart. The highest force in grams required to pull the strips apart is taken as a measure of the heat-seal bond strength.

Modulus or "initial tensile modulus" in p.s.i. is directly related to film stiffness. It is the shape of the initial or Hookian portion of the stress/strain curve, the film being elongated at a rate of 100% per minute and the value being based on the initial cross-sectional area of the sample.

Tear strength is measured according to the procedure of ASTM–689–44.

Gloss is the term used for the quantity of light reflected from the surface of a given area of film. For these films the angle of reflection was taken at 20 degrees and the procedure was that described in ASTM–D523–53T.

Transparency of the film is measured by the procedure of ASTM–D1746–60T.

The dart drop test is carried out according to the procedure described in ASTM–D1709–59T.

Haze is measured according to the procedure of ASTM–D1003–59T.

Crystalline habit was determined by X-ray diffraction. The crystalline form characterized by two maxima, when $2\theta$ is 15.3° and 21.5°, is designated the "delta" form. This appears similar to the crystalline form described by Asby and Hoeg, Journal of Polymer Science, 39, 535 (1959). The crystalline form having four maxima, when $2\theta$ is 14.2°, 17.2°, 18.6° and 21.8°, is designated the "alpha" form. The alpha form appears essentially monoclinic and similar to the crystalline form described by Natta and coworkers (Atti accad. naz. Lincei. Rend Classe sci. fis. mat. e nat. 21 365 (1956), with unit cell dimensions $a$ —6.54 A.°, alpha —95°, $b$=7.47, beta=114.6°, $c$=10.56, gamma=112.5°.

To determine orientation ratio and orientation angle, the films were first converted to the alpha form by heating the films clamped in frames for 10 minutes at 135° C. In this form orientation could be determined conveniently. X-ray diffraction patterns of the film were obtained using the "pole-figure" technique.

The X-ray diffractions were carried out on a General Electric Single Crystal Orienter and the procedure followed for this as well as for representation and analysis of the diffraction data by means of pole figures in that described in Chapter VIII of the brochure "Single Crystal Orienter"—Manual No. 12130 A, prepared by Dr. Thomas C. Furnas, Jr., General Electric Co.

Orientation ratio is a measure of the orientation of the ordered regions in the film. For purpose of this description, it is defined as the ratio of the diffraction intensity of the crystallographic planes in the plane of the film minus the minimum diffraction intensity at any diffraction angle divided by the diffraction intensity of the crystallographic planes of the edge of the film minus the minimum diffraction intensity at any diffraction angle.

Orientation angle is an indication of the degree of alignment of the polymer chains in the crystalline portion of the sample in a direction parallel to the major plane of the film specimen. It is obtained also from the X-ray diffraction pattern. For the samples examined herein, the orientation angle was obtained using the peak intensity at $2\theta=18.6°$.

The sample is rotated through the angular range of chi with the intensity of the X-rays diffracted being monitored. The orientation angle is measured in degrees of the line halfway between the base and the maximum of the peak parallel to the base and intercepted by each end of the curve. The general procedure follows that described by H. G. Ingersoll, J. Applied Physics, 17, 924 (1946).

Example 2

A series of extrusion runs was carried out using several different extrusion methods to illustrate the effects of such different extrusion methods on the properties of the extruded films. A polypropylene resin (Avisun 1014 from Avisun Corp.) having a melt index of 1.1 was used for all of the extrusions. The results of these runs are shown in Table III.

Example 3

A polypropylene resin (Avisun 1014) containing 10% by weight of a 50/50 ethylene/propylene copolymer having a melt index of 0.5 was prepared using the process of Example 1. The properties of the film so produced were as follows:

20° gloss—10.
Transparency, percent—88.
Haze, percent—27.0.
Dart drop (gram/unit)—600+.
Crystalline habit—Delta.
Orientation ratio—9/1.
Orientation angle—30°.
Heat-seal strength, grams/inch—Greater than 1000.

Examples 4–7

The procedure of Example 1 was repeated substantially using several different polypropylene resins as shown in Table IV.

TABLE IV

| Example | Resin | Die temp., °C. | Rate, lbs./hr. | Film speed | Air to bubble (c.f.m.) | Distance die to knuckle, inches | External air quench |
|---|---|---|---|---|---|---|---|
| 4 | "Escon" 114 | 275 | 41 | 36 | 0.3 | 14½ | On. |
| 5 | "Tenite" 4240 | 210 | 35.4 | 40 | 0.3 | 12 | Off. |
| 6 | "Profax" 6420 | 263 | 40.2 | 36 | .05 | 14½ | On. |
| 7 | "Avisun" 1067x | 250 | 35.4 | 40 | 0.3 | 12 | Off. |

The properties and the structural characteristics of the resulting film are shown in Table V.

TABLE V

| Example | Resin | Modulus K, p.s.i. MD/TD | Tear, g./mil MD/TD | Heat-Seal Strength, g./in. | Dart Drop, g./mil | Gloss 20° | Haze, percent | Transparency, percent | Orientation Ratio | Orientation Angle, ° | Crystalline Habit |
|---|---|---|---|---|---|---|---|---|---|---|---|
| 4 | "Escon" 114 | 72/68 | 41/98 | [1]1,000 | 144 | 86 | 1.9 | 72 | 5/1 | 88 | Delta. |
| 5 | "Tenite" 4240 | 66/76 | 52/67 | [1]1,000 | 178 | 125+ | 0.8 | 85 | 3.5/1 | 122 | Do. |
| 6 | "Profax" 6420 | 82/78 | 39/55 | [1]1,000 | 147 | 105 | 1.9 | 78 | >10/1 | 100 | Do. |
| 7 | "Avisun" 1067x | 81/79 | 42/78 | [1]1,000 | 103 | 133 | 0.6 | 76 | 4.7/1 | 80 | Do. |

[1] Greater than.

Having fully disclosed the invention, what is claimed is:

1. A process for preparing biaxially oriented polypropylene film which comprises extruding a polypropylene resin in the form of a molten tubular film at a temperature of 200–275° C.; advancing said molten tubular film over but out of contact with a cooling surface, the cooling surface consisting of at least two sections, a first section being a frusto-conical section, the narrow end of which faces the point of extrusion, serving to cool the film to a temperature within its orientation temperature range, a second section continuous with the first section

TABLE III

| Run no. | Process | Crystalline habit | 20° Gloss | Percent transparency | Percent haze | Dart Drop (gms./mil) | Orientation Ratio | Orientation Angle, degrees | Heat-seal Strength (gms./in.) |
|---|---|---|---|---|---|---|---|---|---|
| A | Same as Example 1 | Delta | 105 | 85 | 1.3 | 170 | 10/1+ | 90 | [1]1,000 |
| B | Flat die—water quench as in U.S. Patent 2,956,306. | Alpha and delta | 63 | 67 | 0.8 | 26 | 1.5/1 | 36 | [1]1,000 |
| C | Blown as in U.S. Patent 2,461,975 | Alpha | 5 | 16 | 19.8 | 24 | 1.4/1 | 18 | [1]1,000 |
| D | Flat die—chill roll quench as in U.S. Patent 2,364,435. | Delta | 100 | 77 | 3.6 | 55 | 1.8/1 | 44 | [1]1,000 |

[1] Greater than.

and from 0.5 to 2 times the length of said first section being a cylindrical section serving to cool the film to a temperature at which said film is set, the annular surface of the first section making an angle α of 25–35 degrees with the annular surface of the second section; expanding the tubular film to a diameter of at least 1.5 times its diameter as extruded while said film is advanced over the cooling surface; and advancing the tubular film at a rate of at least 10 times the rate of extrusion.

2. A process as in claim 1 wherein said angle α is 30 degrees.

3. A process as in claim 1 wherein said tubular film is expanded to a diameter of 1.5–3.0 times its diameter as extruded.

References Cited by the Examiner

UNITED STATES PATENTS

| | | | |
|---|---|---|---|
| 2,852,813 | 9/1958 | Longstreth | 264—210 XR |
| 2,987,767 | 6/1961 | Berry et al. | 264—95 |
| 3,066,356 | 12/1962 | Porter | 264—209 |
| 3,092,874 | 6/1963 | Fallwell | 264—95 XR |
| 3,108,851 | 10/1963 | Hofer et al. | 264—209 |
| 3,112,300 | 11/1963 | Natta et al. | 260—93.7 |
| 3,112,301 | 11/1963 | Natta et al. | 260—93.7 |

ROBERT F. WHITE, *Primary Examiner.*

ALEXANDER H. BRODMERKEL, *Examiner.*

J. R. DUNCAN, M. H. ROSEN, A. R. NOE,
*Assistant Examiners.*